Dec. 13, 1966　　　　　H. A. McMASTER　　　　　3,291,590
APPARATUS FOR BENDING GLASS SHEETS

Filed Sept. 11, 1964　　　　　　　　　　　　　　　3 Sheets-Sheet 1

INVENTOR.
Harold A. McMaster
BY
Barnard, McGlynn & Reising
ATTORNEYS

Dec. 13, 1966   H. A. McMASTER   3,291,590
APPARATUS FOR BENDING GLASS SHEETS
Filed Sept. 11, 1964   3 Sheets-Sheet 2

CHORD HEIGHT

DISTANCE

INVENTOR.
Harold A. McMaster
BY
Barnard, McGlynn & Reising
ATTORNEYS

Dec. 13, 1966   H. A. McMASTER   3,291,590
APPARATUS FOR BENDING GLASS SHEETS
Filed Sept. 11, 1964   3 Sheets-Sheet 3

INVENTOR.
Harold A. McMaster
BY
Barnard, McGlynn & Reising
ATTORNEYS

United States Patent Office 3,291,590
Patented Dec. 13, 1966

3,291,590
APPARATUS FOR BENDING GLASS SHEETS
Harold A. McMaster, Woodville, Ohio, assignor to Permaglass, Inc., Woodville, Ohio, a corporation of Ohio
Filed Sept. 11, 1964, Ser. No. 395,717
7 Claims. (Cl. 65—182)

This invention is a continuation-in-part of application Serial Number 328,392 filed December 5, 1963, now abandoned, in the name of Harold A. McMaster and relates to a method and apparatus for treating curved sheets of thermoplastic material and more particularly to a method and apparatus for manufacturing tempered curved glass sheets such as are currently used for automobile windows.

In recent years there has been a greatly increased demand for curved glass sheets or plates for use as automobile windows, protective windows for television screens, building windows, etc. At the same time there has been ever increasing recognition of the advantages of tempered glass particularly its high strength and safety features, and hence the current demand is for windows of tempered curved glass. To manufacture tempered glass it is necessary that the individual glass pieces first be cut and formed to the particular shape desired and then tempered. Hence, to manufacture curved tempered glass automobile windows or the like, the essential sequence of steps is (1) form an untempered glass sheet to proper size, with edges rounded and polished as desired, (2) heat and bend the sheet to the curvature required and (3) rapidly and uniformly cool the curved sheet to provide the temper.

In United States patent application Serial Number 326,713 filed November 29, 1963, in the names of Harold A. McMaster and Norman C. Nitschke there is disclosed and claimed an improved method and apparatus for manufacturing curved tempered glass sheets on a continuous basis. In accordance with that invention, the glass sheets to be curved and tempered are moved along an elongate perforated bed which extends through a heating furnace and then through a cooling blasthead, the bed being initially flat and then in a transition zone thereof gradually becomes transversely curved. The glass sheets are floated on the bed within the furnace by hot gases emitted from the perforations therein. Hence, by the time the glass sheets have reached the transition zone they have been heated by the hot gases to deformation temperature such that they sag by gravity to conform to the curved surface of the bed. The hot curved glass sheets are then floated through the blasthead where they are cooled by and supported by room temperature air emitted from that portion of the bed within the blasthead. With such method and apparatus excellent tempered curved glass sheets can be produced at a continuous high production rate and at relatively low cost.

One of the more serious problems in a method of the type described is that of preventing any contact of the softened glass with the bed since if there is any such contact, marring of the glass will result. The problem is most acute in the transition zone wherein the bed changes from flat to curved contour since it is in this zone where the soft glass sheets must sag to their new curved shape. It is, of course, highly desirable to have minimum spacing between the bed and the glass sheet as the latter passes over the transition zone since with greater spacing there is greater possibility that the glass sheet will, due to the slightest irregularities in the gas flotation pressure, assume a configuration not identical with that of the bed. In order for the glass sheet to assume a configuration identical with that of the curvature of the bed it must be heated to a very high temperature so that gravity can cause its deformation. As the glass moves along the flat portion of the bed it is being heated to its deformation temperature, however, when the glass sheet is above the flat portion of the bed it is at a relatively low temperature and its pliability or ability to deform under the force of gravity, is relatively low or nil. Therefore, if a sheet of glass passes over an abrupt change in the contour of the bed while it is at a low temperature it will not sag due to gravity to the degree necessary for it to remain at a constant distance from the bed at all points therealong. That is to say, if a sheet of glass at a temperature below deformation temperature moving along the bed passes from the flat portion thereof over a point at which the bed begins to fall away, the glass sheet will extend out over the portion of the bed which falls away in a cantilever fashion thereby increasing the distance from the bed to the glass along the portion of the bed which falls away. As a result of this cantilever action there is a resultant moment acting on the glass creating a force acting downwardly on the glass at a point, or right above the point, at which the bed begins to fall away and, therefore, tends to cause the glass to come in contact with the bed at that point. It is, therefore, necessary to utilize a bed which has a transition portion of the curvature of which increases at a rate commensurate with the deformation capabilities of the glass sheet which passes thereover so that the glass sheet will sag and conform to the bed as rapidly as possible and remain at a constant distance above the bed at all points. In other words, the curvature of the bed cannot increase at a rate such that a sheet of glass moving along the bed will not sag at the same rate under force of gravity to conform to the curvature of the bed. Of course, one way to solve the problem is to change the contour of the bed from flat to curved extremely gradually, but this results in a very long transition zone thereby greatly increasing the cost of furnace construction, by reason of the added length, along with operating and maintenance costs due to the extra costs of heating and maintaining the added length of furnace. In essence then the perfect system is one wherein there is extremely close spacing between the bed and the glass sheets to provide optimum control in bending the glass to predetermined curvature along with minimum possibility for contact between the glass and the bed and with the shortest possible transition zone. The present invention provides such a system.

Briefly, in accordance with the present invention the transition zone of the bed wherein the bed changes contour along its longitudinal axis from flat to transversely curved, is shaped such that the rate of change in degree of transverse curvature, from flat to full predetermined curvature, is first relatively low, then increases and then later decreases. More particularly the rate of change in the degree of transverse curvature along the transition portion is first gradual and increasing, then rapid and increasing, then constant, then rapid and decreasing, and finally gradual and decreasing. Of course the longitudinal center line of the bed throughout the length thereof is a straight line and it will be manifest, therefore, that as the curvature increases in the transition zone the bed edges fall away, so to speak, from the bed center line, the bed edges being at the same level as the center line in the flat bed portion and then gradually becoming lower and lower with respect to the bed center line as there is movement through the transition zone. Hence, another way to generally express the concept of this invention is that the rate at which the bed edges fall away from the longitudinal center line of the bed through the transition zone is first relatively low, then increases and then decreases. A plot of such rate of change results in a curve which approximates a sine curve. With such structure a relatively short transition zone can be used along with extremely close spacing between the glass sheets and the bed and yet with minimum possibility of marring contact between the glass and the bed. Such a bed structure takes full advantage of the deformation capabilities of the sheet of glass in that it changes contour as rapidly as the glass sheets heated to deformation temperature will deform under the force of gravity. Other objects, features and advantages of the invention will appear more clearly from the following detailed description of a preferred embodiment thereof made with reference to the drawings in which:

Figure 2:
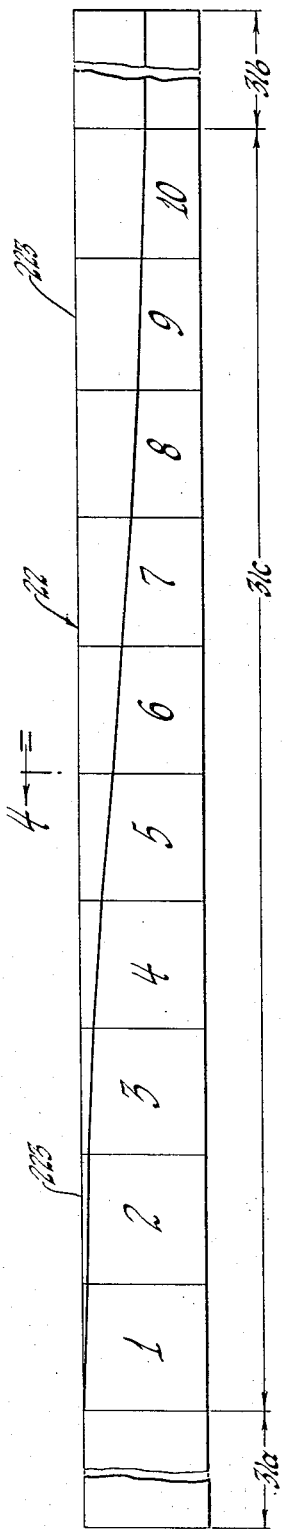
FIGURE 2 is a side view of an illustrative perforated bed to show the transition of the surface contour from flat to curved.
Figure 4:
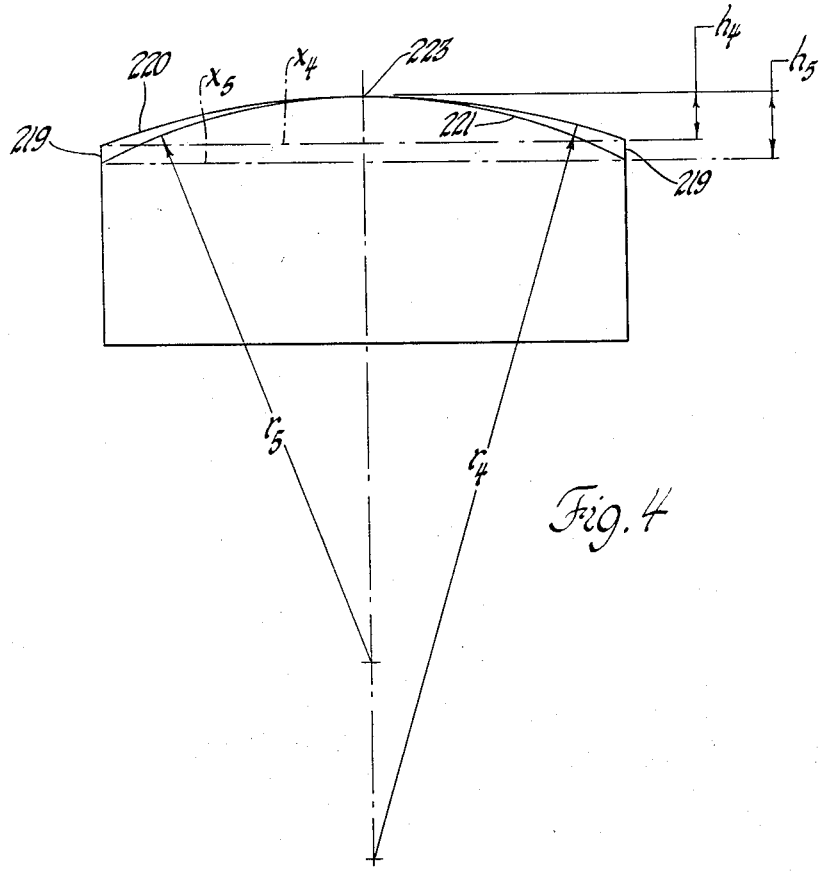
Figure 5:
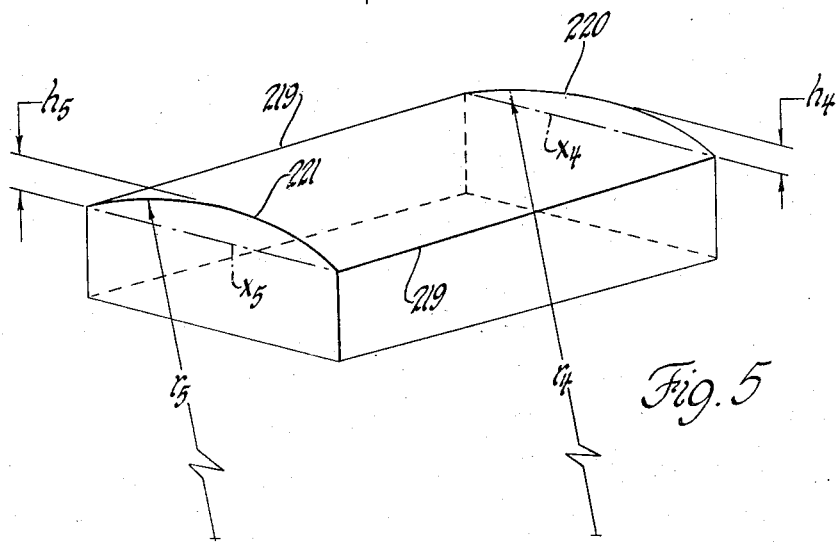

FIGURE 4 is an enlarged end view of the block 5 of the bed of FIGURE 2 and is taken along line 4—4 thereof and more particularly illustrates the transition along each block of the bed surface in the transition zone; and FIGURE 5 is an elongated prospective view of the block 5 which is illustrated in FIGURES 2 and 5.

Figure 1:
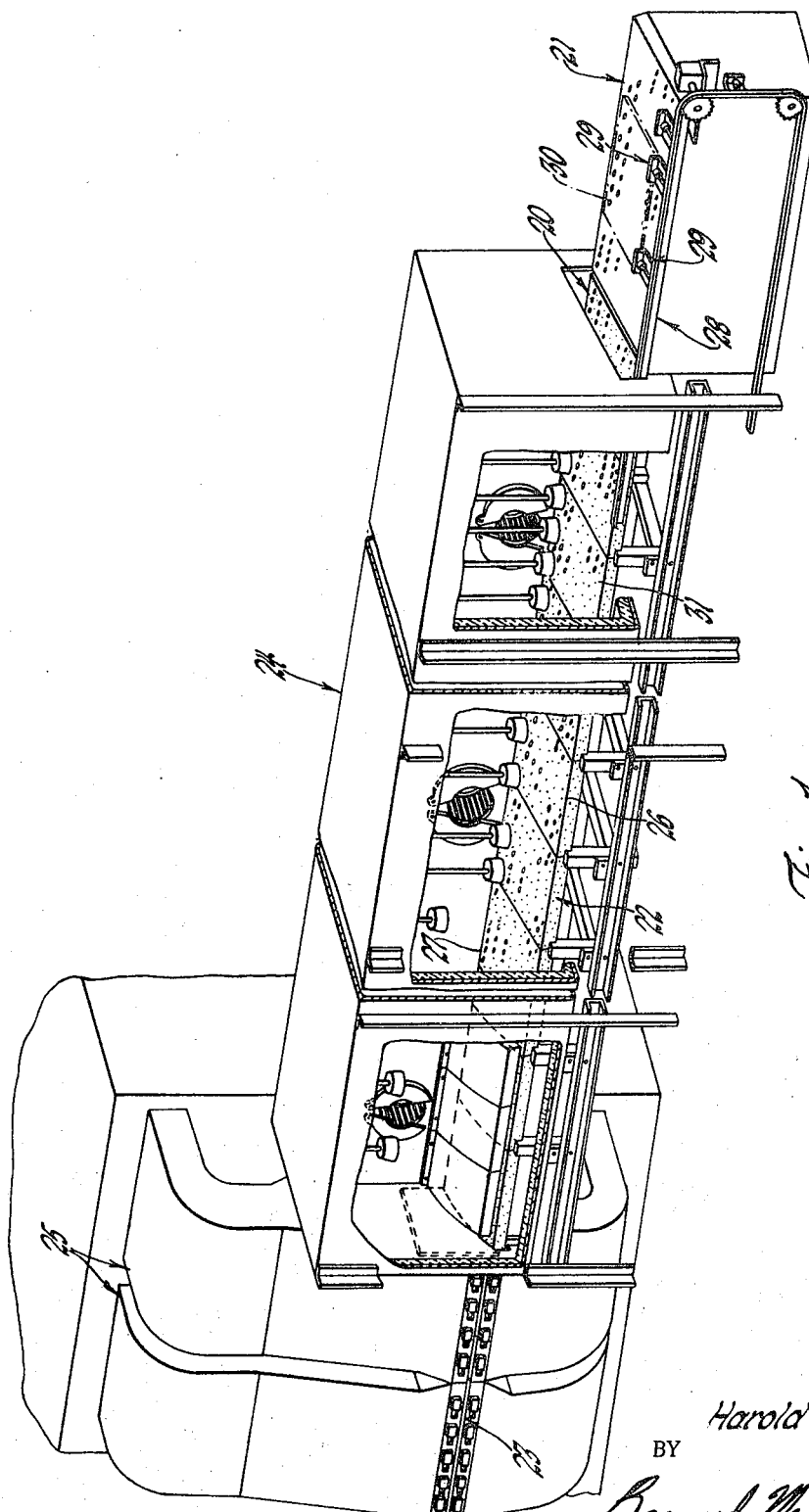
FIGURE 1 is an isometric view, with parts broken away and partially schematic, of the preferred apparatus and illustrates the bed configuration into and through the heating furnace wherein the glass sheets are curved, and into and through blasthead wherein the curved glass sheets are tempered.

Referring now to FIGURE 1, the apparatus shown comprises an elongate perforated bed, illustrated generally by the numeral 20, which in the actual embodiment herein shown is about 180 feet long and is composed of three main sections. These sections include a loading section 21, a heating and bending section 22, and a tempering section 23. The heating and bending section 22 is within and constitutes the floor of an elongate furnace structure, illustrated generally by the numeral 24, and the tempering section 23 extending through a cooling blasthead, illustrated generally by the numeral 25. The bed is flat throughout section 21 and most of section 22, and approximately two-thirds of the way through section 22 is the transition zone wherein the bed gradually becomes convexly curved in a direction transverse to the longitudinal axis of the bed. Bed section 23 within the blasthead 25 and the portion of section 22 toward the end of the furnace adjacent the blasthead have a uniform transverse curvature the same as that desired of the glass sheets to be manufactured. The plane of the bed is tilted about the longitudinal axis thereof so as to form an angle with the horizontal, and hence the left longitudinal edge of the bed, as shown at 26 is lower than the right edge 27. The significance of the tilt of the bed is disclosed and covered in United States patent application Serial No. 424,331 filed January 8, 1965, in the name of Dexter H. McMaster and assigned to the assignee of the present invention. A chain conveyor, illustrated generally by the numeral 28, carrying spaced pairs of glass sheet support pads 29, serves to move the glass sheets over the bed 20 from the loading section 21 through the furnace 24 and throughout the blasthead 25. Gas emitted from perforations in the bed 20 provide a film or cushion of gas on the bed for flotation of the glass sheets thereover in a manner more particularly set out and described in the aforesaid United States patent application Serial Number 326,713 filed November 29, 1963. In essence, then and without attention to details as disclosed in the aforesaid patent application, which details are incorporated herein by reference, the apparatus operates as follows: The glass sheets 30 to be curved and tempered are placed onto the bed at loading section 21 with the bottom edges of each sheet resting on a pair of pads 29 secured to the conveyor chain 28. The glass sheets are conveyed by the chain and float over the bed out of contact therewith by reason of the gas emitted from the perforations in the bed. The floating gas sheets are thus guided through the furnace 24 where they are heated to deformation temperature by the hot gases emitted from the bed perforations and as they reach and pass over the transition zone of section 22, the sheets sag under gravity to conform to the curvature thereof, all the while supported on gas out of contact with the bed. Hence, when the sheets reach the end of the furnace they are shaped with the full curvature desired. Transportation of the floating heated curved glass sheets then continues through the blasthead 25 where they are tempered by the cooling air projected from the bed perforations in the blasthead.

The entire bed section 22 is formed of ceramic, having an extremely low coefficient of thermal expansion. More specifically, the bed section 22 in the furnace 24 is formed of fused quartz blocks 31, each of which has a width equal to the width of the bed and a length of about 30 inches. Some of the blocks 31 are illustrated by the numbers 1 through 10 in FIGURE 2. Hence, the entire 140 foot bed section 22 comprises fifty-six of the quartz blocks 31 axially aligned and in abutting relationship and preferably with a smooth powdered fused quartz caulking filling any crevices therebetween. The blocks are manufactured by casting and then firing to sintering temperature granular fused quartz preferably of variated grain size. Preferably, the blocks are cast with the overall curved or other surface configuration desired and with at least the larger of the gas passages therein and, after firing, are machined to their precise final shape. Of course, the manner in which the blocks are manufactured is immaterial to this invention so long as the shape of the blocks is such that the blocks, when placed together to form the bed, accomplish the curving of sheet glass at a rate which is generally sinusoidal and, in that light, it is recognized that those skilled in the art will readily appreciate that there are many possible methods and apparatus for forming the blocks. However, it is a very significant attribute of this invention that the blocks each have a precise form which enables each block to be manufactured in a rapid and inexpensive manner. That is to say, the instant invention teaches a relationship in change of curvature along successive blocks of the bed such that a complicated forming or manufacturing method need not be employed, rather, each individual block has a surface which can be formed by utilizing a grinding wheel which is cylindrical and can be moved from one side of the block to the other while maintaining its longitudinal axis parallel to a plane containing the longitudinal axis of the block and perpendicular to the horizontal axis of the block. However, it is within the confines of this invention to use successive blocks in the transition zone which are transversely curved and longitudinally curved. If the blocks in the transition zone have surfaces of compound bends, i.e., curved transversely and longitudinally, the edges of the blocks would form a true curve and would not be comprised of a series of straight lines as when the blocks are only transversely curved.

The blocks have such a low coefficient of thermal expansion that the overall linear expansion of the full 140 foot bed in going from room temperature to 1200 degrees F. is less than about 1 inch and the expansion across the width of the bed and through the thickness of the bed is so little as to be negligible. Further, the quartz bed has extremely high heat resistance, erosion resistance, and heat shock resistance and therefore lasts indefinitely with practically no maintenance.

It will be noted from the various figures of the drawings that the perforations or holes on the bed sections 31 from which the hot gases are emitted to support and heat the glass sheets are of varying patterns, size, and location. Along a major portion of the length of the bed 20, up to the last few feet of the flat portion, there are only gas inlet passages through the various bed sections. In this portion of the bed the glass sheets float relatively high, about .04 to .25 inch above the bed. In remaining portion of the bed which includes the last part of the flat portion and the entire portion where the surface contour is curved, both inlet and exhaust passages are provided. In this portion of the bed wherein there are both inlets and outlets, the glass sheet floats low, about .005 to .02 inch above the bed. The size, number, and location of the passages permits the use of a low pressure flow system of recirculating gases to float the glass sheet over a substantially continuous blanket of hot gas between the bed and the glass sheets.

As alluded to previously, if the bed surface contour changes too rapidly from flat to curved, the glass sheet is liable to come in contact with the surface of the bed and thus scratch or mar the glass sheet. Keeping in mind that the glass sheet 30 is semi-rigid and is floating quite close to the bed, and that it is the force of gravity which causes the glass sheet to deform into the curved condition following the contour of the support bed 20, it will be seen that if the beginning of the transition is too abrupt, it is possible for the center of the edge of the glass sheet, adjacent the chain conveyor, to hit or scrape the edge of support bed 20. Also, if in the remainder of the transition the rate of curvature change is too rapid, there can be nonuniformity in the spacing of the sheet from the bed due to the inability of the sheet to bend rapidly enough to conform to the changing curvature, and this can result in nonuniformity of the gas support blanket over the bottom surface of the glass. If this occurs the glass sheet can drop to the point where the middle of the sheet adjacent the bed centerline contacts and drags on the bed. The present invention accomplishes the curvature transition in the shortest possible distance and with the least possibility of scraping or pressure nonuniformity problems as aforesaid.

Referring to FIGURE 2, the ceramic bed 22 is illustrated to be composed of a plurality of block sections and may be described as including three zones. The first zone 31a includes block sections which have a flat surface contour and extend from the beginning of the furnace a considerable distance along the length thereof to allow the glass sheets to come to suitable deformation temperature. In the preferred embodiment the length of the flat zone is approximately 100 feet. The second zone 31b of block sections is at the opposite end of the furnace and includes block sections which have the fully curved surface contour, the curvature being that desired of the glass sheets as they go into the blasthead 25 for the tempering operation. This fully curved zone generally need only be about 15 feet long or less if desired. The third zone 31c of the bed 22 is the transition zone between the flat contoured block sections and the fully curved block sections. The transition zone 31c includes a series of block sections 1–10 which have a continuing change in curvature, in accordance with the invention, to allow the glass sheets to deform without engaging the surface of the bed. That is, the transition zone which is composed of the block sections 1–10 changes curvature at a rate which when plotted results in a curve approximating a sine curve, generally the rate of change first being relatively small, then greater, and then small again. The block sections 1–10 in FIGURE 2 are merely illustrative and not in proportion to the shape at the actual blocks 31, since the blocks 31 are elongated. However, the blocks 1–10 show the surface contour relationship of the blocks 31 of the actual bed.

Figure 3:
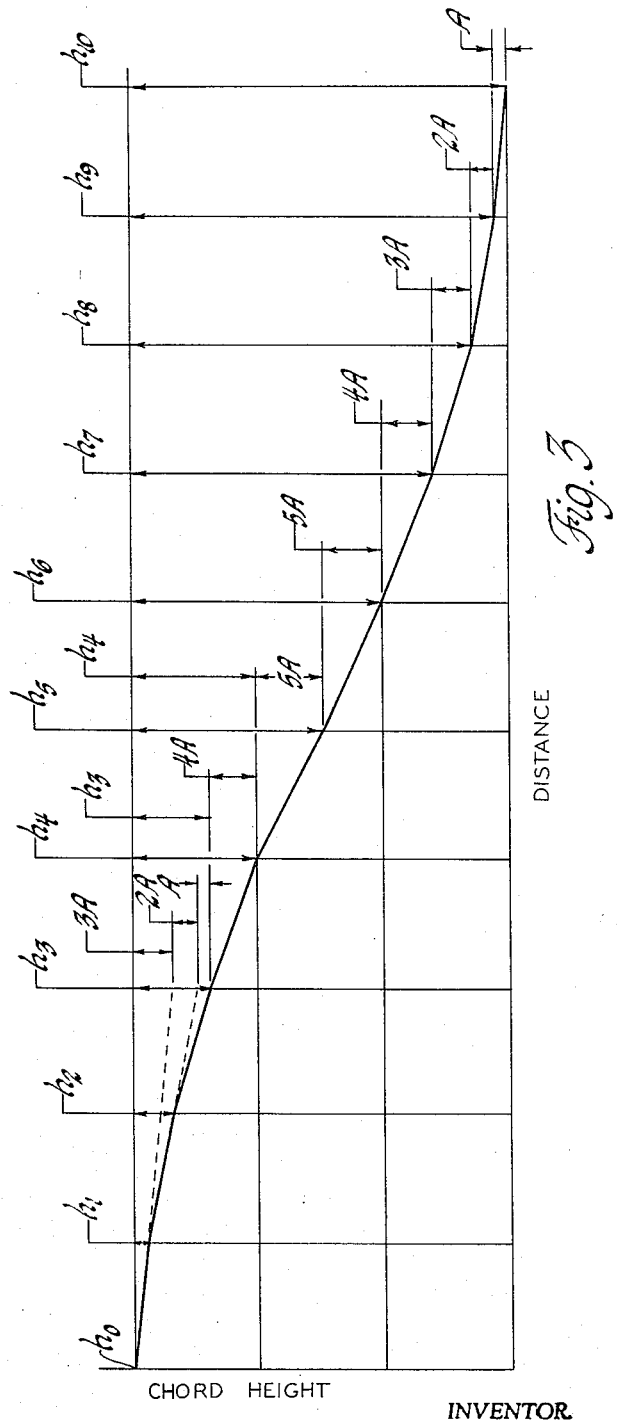
FIGURE 3 is a graph showing the variation in chord height of various sections of the bed in the transition zone, having the distance along the bed on the abscissa and the chord height at the various distances on the ordinate.

To best illustrate this sinusoidal-like transition, reference is now made to FIGURES 3, 4, and 5 which show the variation in chord height relative to distance along the bed 22. Several factors must be considered when designing the transition portion of the bed. These factors include such things as the conveyor speed, the maximum length and width of glass to be treated, maximum float height of the glass over the bed, final radius of bed, and the rate at which the glass will bend at a given temperature. The typical cross-sectional configuration of a block section in the transition zone 31c is shown in FIGURE 4 which is an enlarged end view of block 5 as illustrated in FIGURE 2. As alluded to previously, the longitudinal center line of the bed throughout its length is a straight line 223. However, in the transition zone 31c the edges 219 of the blocks of the bed fall away from the center line thereby increasing the degree of curvature therealong. This is apparent from FIGURE 4 wherein it is disclosed that the curvature 220 at one end of the block is evolved by a radius $r_4$, and the degree of curvature 221 at the other end of the block is increased since it is evolved by a shorter radius $r_5$. The centers of curvature of the various degree of curvature along the transition zone 31c all fall on a straight line which is perpendicular to the chords $x$ and passes through the center of the width of the respective blocks. The chord $x_4$, extending across the curved surface 220, lies at a chord height $h_4$ below the highest point 223 of the curved surface 220, the height $h_4$ being measured along a radius $r_4$ as the radius passes through the highest point of curvature 223. Likewise, the chord $x_5$ extends across the curved surface 221 from one edge of the block to the other and lies at a distance $h_5$ below the highest point 223 of the curved surface 221, and is measured along a radius $r_5$ when such radius passes through the highest point of curvature 223. Since the width of each block does not change along the length of the bed 22, the chord for respective degrees of curvature will have the same length. Thus, the chord height $h$ will vary in proportion to the changes in the degree of curvature along the transition zone 31c. It is also apparent from FIGURE 4 that the radius $r$ will vary in accordance with the chord height $h$ and/or the degree of curvature along the length of the transition zone 31c.

In FIGURE 5 there is represented an elongated prospective view of a block utilized in the transition zone 31c such as the block 5 represented in FIGURES 2 and 4. As is apparent from FIGURE 5 the degree of curvature 220 at the forward end of the block is less than the degree of curvature 221 at the other end of the block. Likewise in proportion to the degree of curvature at each end of the block, the chord height $h_4$ is less than the chord height $h_5$. Furthermore, since the width of a block remains constant regardless of the degree of curvature therealong, the curved surface of any one block in the transition zone 31c is not a portion of cone, but rather may be evolved by passing a straight line across the block while maintaining the line, at all times during its movement across the curved surface of the block, parallel to a vertical plane containing the longitudinal axis or the highest point of curvature 223 of the block. This is an important attribute of the respective blocks of the bed since its simplifies the manufacturing process by allowing the curved surface of a given block to be formed by passing a cutting or machining device from one edge of the block across the block while maintaining the cutting edge along the block surface always in a vertical plane which is parallel to the longitudinal axis of the block. For example, a cylindrical grinding wheel may be used to form the curved surface of the block by passing the grinder across the block while maintaining its axis of rotation in a vertical plane parallel to the longitudinal axis of the block thereby to form the curved surface. It is also evident from FIGURES 2, 3, 4, and 5 that the points at which the curvature, along the length of a given block, intersects the sides of the block from straight line edges 219. However, as illustrated in FIGURE 2 these respective straight line edges for successive blocks are not parallel; that is to say, that the parallel edges for each respective block in the transition zone 31c are at a different angle with the longitudinal axis of the bed than the parallel edges of an abutting block. The relationship of these angles will be more fully set forth hereinafter.

In an actual embodiment of the invention, the following parameters have been found desirable—

Conveyor speed: 400 inches per minute
Maximum glass size: 60" long by 22" wide
Final bend radius: 59.52 inches The rate of bed was found by laboratory tests to require 15 seconds for ¼ inch clear plate glass preheated to 1200° F. to form a 59.52 inch radius.

With the conveyor moving at 400 inches per minute, the bend could occur in 100 inches of bed length if other factors did not interfere. From geometry it can be shown that the relation between R, h and x for a given degree of transverse curvature in FIGURE 4 is $$R = \frac{h}{2} + \frac{x^2}{8h}$$

The desired chord height $h$ for a 22-inch chord ($x=22$ inches) and radius R of 59.52 inches is 1.025 inches. If this depth of bed were to be achieved uniformly in 100 inches by maintaining the center of the bed at a constant level and allowing the edges 219, i.e., the intersection of the curvature with the side of the block, to fall downward, the edge of the bed would slope 0.01025 inch per inch.

A piece of semi-rigid glass, 60 inches long and extending 30 inches into such a transition zone would be 0.3075 inch ($30 \times 0.01025$) above the bed at its leading corner or, if it balanced at the abrupt beginning of the transition, 0.15375 inch. The air cushion offers very little support at such a distance and even if some bending occurred, there would be a great likelihood that the glass would rub the bed at the abrupt beginning of such a transition and become irreparably scratched.

Since the glass is supported up to 0.020 inch above the bed, it is desirable that the bed edges not depart from the highest point of curvature 223, which is a straight line, more than .02 inch per sixty inches of bed length. If the edges of the first 30 inch long block of the transition bed sloped downward 0.034 inch and the glass balanced at its midpoint, the clearance of 0.017 inch at each end of the sheet would be supported and no scratching would occur, particularly since some bending will enable the glass to follow a mild departure of this size. The total drop of 1.025 inches would require 30 blocks at 0.03417 per block, which is excessively long.

A substantial reduction in the length of the transition zone is achieved by varying the slope of the edge 219 of each respective 30 inch block. This may be accomplished by changing the slope of the edge of successive blocks along the bed by a constant amount whether the slope is increasing from block to block or decreasing from block to block. An alternative way of describing the configuration of curved surface of the blocks along the transition portion 31c of the bed is to say that the chord heights vary by increasing gradually at first, then increasing rapidly, then increase by a constant length, then increase at a rapidly decreasing length, and finally increase gradually. Therefore, since the degree of curvature in any transverse plane through the transition portion of the bed is proportional to the chord height, the degree of curvature increases at a constant rate along each respective block, and the rate of increase of the degree of curvature is different for each successive block. Furthermore, the rate of increase of the degree of curvature from block to block along the transition zone 31c increases gradually at first, then increases rapidly, then may be constant, then decreases rapidly, and then decreases gradually. The contour of the transition portion of the bed may be represented by the following series where A represents $h$, or the slope of the first block, and utilizing the 0.034 inch for A as discussed above, the chord height $h$ at the ends of successive blocks may be determined:

$h_1 = A$
$h_2 = A + 2A$
$h_3 = A + 2A + 3A$
$h_4 = A + 2A + 3A + 4A$
$h_5 = A + 2A + 3A + 4A + 5A = 15 \times 0.03417 = 0.5125''$ Thus, it can be seen that in five blocks increasing and five blocks decreasing the slope of their respective edges, the entire transition can take place in ten blocks, or ⅓ of the 30 blocks required for constant slope with the same rate of change of curvature per block when A equals 0.03417 inch. The full sequence can be stated as follows:

$h_0 = 0$
$h_1 = h_0 + A$
$h_2 = h_1 + 2A$
$h_3 = h_2 + 3A$
$h_4 = h_3 + 4A$
$h_5 = h_4 + 5A$
$h_6 = h_5 + 5A$
$h_7 = h_6 + 4A$
$h_8 = h_7 + 3A$
$h_9 = h_8 + 2A$
$h_{10} = h_9 + A$

It is to be understood that this invention incompasses all values of A since A is dependent on many variables such as the length of the sheets of glass to be treated, the temperature to which they are to be heated, their thickness, their ability to deform, or sag, to conform to the curvature of the bed, and the length of the individual blocks. Furthermore, the change in slope of the edges of each block is not more than A from one block to the next whether increasing or decreasing.

Under such conditions, it has been found most desirable to have the chord height $h$ and the radius R vary along the length of the transition zone in accordance with the following values:

| Distance (inches) | Chord Height $h$ (inches) | R (inches) |
|---|---|---|
| 0 | 0 | Flat |
| 30 | 0.0342 | 1,818.2 |
| 60 | 0.1026 | 590.8 |
| 90 | 0.2052 | 294.1 |
| 120 | 0.3420 | 176.8 |
| 150 | 0.5125 | 111.2 |
| 180 | 0.6834 | 88.9 |
| 210 | 0.8201 | 74.1 |
| 240 | 0.9226 | 66.0 |
| 270 | 0.9909 | 61.57 |
| 300 | 1.0250 | 59.52 |

FIGURE 3 is a plot of distance versus chord height $h$ to show the manner in which the chord height varies along the length of the transition zone. The abscissa (distance) increases from right to left, as viewed in the drawings, and is plotted in inches. Each vertical line on the graph may represent 30 inches or one block section of transition portion 31c. The ordinate (chord height) increases vertically and shows chord heights varying from 0 to 1.0250 inches. Therefore $h_1$ represents the chord height at the end of the first block 1, which is illustrated in FIGURE 2, and $h_2$ is the chord height at the end of the second block, $h_3$ is the chord height at the end of the third block, $h_4$ is the chord height at the end of the fourth block, and so on. It is apparent from the curve of FIGURE 3 that the line connecting the chord height $h_1$ and the chord height $h_2$ at the surface of the block 2 is a straight line and has less of a slope than the straight line connecting the chord heights $h_2$ and $h_3$ at the surface of block 3. By extending the straight line connecting $h_0$ with $h_1$ it is seen that it intersects the chord height $h_3$ at a distance of 3A below the zero chord height $h_0$ or below the highest point of curvature 223. Also, if the straight line connecting the chord height $h_1$ with chord height $h_2$ is extended, it intersects the chord height $h_3$ at a total distance of 5A below the zero chord height $h_0$ or line 223, yet chord height $h_3$ equals 6A, therefore, the difference in slope between the line joining $h_1$ with $h_2$ and the line joining $h_2$ wtih $h_3$ is A. Furthermore, the slope of the individual straight lines connecting respective chord heights as illustrated in FIGURE 3 represent the slopes of the edges 219 of the respective blocks in the transition zone. It is clear, therefore, from FIGURE 3, that the change in slope of parallel edges 219 from one block to the next along the transition portion 31c increases or decreases no more than the selected value A. It will be noted that the curve of FIGURE 3 is similar to a sine function. The slope of the curve changes gradually at first, then changes rapidly, and finally changes gradually again toward the end of the transition zone. This provides an optimum transition period for the glass sheets along the surface of the bed 22 and avoids the contact problem between the glass and the bed which so readily occurs in a relatively short transition zone not embodying the invention. Hence, the almost sinusoidal variation in chord height permits the complete transition to take place within a relatively short section of the bed 22. Of course, it will be undersood that whereas FIGURE 3 shows the curvature changing in short straight line increments, the curvature can be continuous and smooth, a continuous smooth curve being ideal albeit not essential. However, as alluded to previously, a smooth curve means the surface of the blocks in the transition portion is curved not only transversely, but longitudinally also, which makes the blocks more difficult to form.

It is apparent that modifications and alterations in the invention may be made by those having skill in the art having now had reference to the foregoing description and drawing. Thus, it is not intended to limit the scope of the invention by such description and drawings but by the appended claims in which:

I claim:

1. In an apparatus for treating sheet material, an elongated bed having at least a portion curved transverse to the longitudinal axis thereof with a degree of transverse curvature which continuously increases therealong, said degree of transverse curvature changing at different rates of change at successive equally spaced points along the longitudinal axis of said portion of said bed, said rates at said equally spaced points when plotted against distance along the longitudinal axis of said portion being a portion of a sine curve, means supplying fluid over said portion of said bed for at least partially supporting a sheet thereover, and means for heating the sheet.

2. An apparatus as set forth in claim 1 wherein each of said different rates of change of said transverse curvature is constant for a distance along said portion of said bed.

3. An apparatus as set forth in claim 2 wherein said different rates are each constant an equal distance along said portion of said bed.

4. An apparatus as set forth in claim 3 wherein said portion of said bed is disposed between a second portion having a substantially flat surface and a third portion having a degree of transverse curvature which is constant therealong.

5. The apparatus set forth in claim 1 wherein said portion of said bed comprises increments at the end of each of which the depth of curvature increases according to a first series $$h_1=h$$
$$h_2=h_1+2h_1$$
$$h_3=h_2+3h_1$$
$$h_4=h_3+4h_1$$
etc.

where $h$ is the depth of curvature of said increments, said first series being followed by a second series represented by:

$$h_{n+1}=h_n+nh$$
$$h_{n+2}=h_{n+1}+nh_1$$
$$h_{n+3}=h_{n+2}+nh_1$$
etc.

and said second series being followed by a third series, the last term of which is $$h_m=h_{m-1}+h$$

and which is preceded by $$h_{m-1}=h_{m-2}+2h$$
$$h_{m-2}=h_{m-3}+3h$$
etc.

6. An apparatus for treating sheet material comprising; an elongated bed having at least a portion curved transversely to the longitudinal axis thereof, said portion of said bed including a plurality of blocks with the ends thereof abutting one another and each having a curved upper surface and parallel sides extending generally longitudinally along said portion of said bed, each of said blocks having straight parallel edges defined by the intersection of said curved upper surface and said parallel sides thereof, said blocks being curved so that the slope of said parallel edges of successive blocks along said portion of said bed increases from one block to the next and thereafter decreases from one block to the next, means supplying fluid over said curved surface of said blocks for at least partially supporting a sheet thereover, means for heating the sheet, and means for moving the sheet over said blocks whereby the curvature of the sheet gradually increases by conforming to the curved surfaces of said blocks when moving thereover.

7. An apparatus as set forth in claim 6 wherein the change in said slope from one block to the next along said portion of said bed is constant when said slope from one block to the next is increasing and when said slope from one block to the next is decreasing.

References Cited by the Examiner

FOREIGN PATENTS 622,746  3/1963  Belgium.

DONALL H. SYLVESTER, *Primary Examiner.*

S. LEON BASHORE, A. D. KELLOGG,
*Assistant Examiners.*